(12) United States Patent
Koch

(10) Patent No.: US 7,397,513 B2
(45) Date of Patent: Jul. 8, 2008

(54) METHOD FOR REPRESENTING VIDEO DATA

(75) Inventor: Hartwig Koch, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 436 days.

(21) Appl. No.: 10/450,888

(22) PCT Filed: Dec. 19, 2001

(86) PCT No.: PCT/DE01/04793

§ 371 (c)(1),
(2), (4) Date: Jun. 17, 2003

(87) PCT Pub. No.: WO02/071744

PCT Pub. Date: Sep. 12, 2002

(65) Prior Publication Data

US 2004/0036803 A1 Feb. 26, 2004

(30) Foreign Application Priority Data

Mar. 2, 2001 (DE) ................................. 101 10 043

(51) Int. Cl.
*H04N 7/00* (2006.01)
(52) U.S. Cl. ...................................................... 348/552
(58) Field of Classification Search ................ 348/552, 348/553, 725, 723, 726, 734; 725/78; 340/825.25, 340/825.72, 825.69; 375/130; 379/110.01; 455/579
See application file for complete search history.

(56) References Cited

U.S. PATENT DOCUMENTS

| 5,590,414 | A | * | 12/1996 | Marui et al. | 455/569.2 |
| 6,036,086 | A | * | 3/2000 | Sizer, II et al. | 235/375 |
| 6,097,441 | A | * | 8/2000 | Allport | 348/552 |
| 6,125,172 | A | * | 9/2000 | August et al. | 379/110.01 |
| 6,313,887 | B1 | * | 11/2001 | Gudorf | 348/734 |
| 6,389,055 | B1 | * | 5/2002 | August et al. | 375/130 |
| 6,636,749 | B2 | * | 10/2003 | Holmes et al. | 455/569.2 |
| 2002/0056112 | A1 | * | 5/2002 | Dureau et al. | 725/78 |

FOREIGN PATENT DOCUMENTS

| DE | 197 25 898 | 12/1998 |
| DE | 197 46 597 | 4/1999 |
| DE | 198 52 659 | 5/2000 |
| DE | 199 01 733 | 7/2000 |
| DE | 199 07 418 | 8/2000 |
| DE | 199 28 903 | 1/2001 |

(Continued)

OTHER PUBLICATIONS

Michael Zhen, "Open Up for Lots of Functions", 1997, vol. 24, pp. 60-64. MOT.

(Continued)

*Primary Examiner*—Paulos M. Natnael
(74) *Attorney, Agent, or Firm*—Kenyon & Kenyon LLP

(57) ABSTRACT

A method for displaying video data. Video data are loaded from a data carrier in a car radio as a radio receiver and transmitted via an interface to an electronic assistant, which takes on the task of decoding and reproducing the video data. Accompanying audio data are then decoded and reproduced either by the car radio or the electronic assistant.

13 Claims, 3 Drawing Sheets

FOREIGN PATENT DOCUMENTS

| | | |
|---|---|---|
| EP | 0 648 045 | 4/1995 |
| EP | 0 952 734 | 10/1999 |
| EP | 0 967 797 | 12/1999 |
| JP | 4004467 | 1/1992 |
| JP | 7298368 | 11/1995 |
| JP | 9021649 | 1/1997 |
| JP | 2000285660 | 10/2000 |
| WO | WO 99 34599 | 7/1999 |
| WO | WO 99/34599 | 7/1999 |
| WO | WO 00 41381 | 7/2000 |
| WO | WO-200041381 * | 7/2000 |
| WO | WO 00 76217 | 12/2000 |

OTHER PUBLICATIONS

"Pilot on Board", 1992, vol. 22, pp. 158-163, Car & Technology.

* cited by examiner

METHOD FOR REPRESENTING VIDEO DATA

FIELD OF THE INVENTION

The present invention relates to a method for displaying video data.

BACKGROUND INFORMATION

Today's car radios, used as radio receivers, often include a CD player (drive), and navigational devices also include a CD-ROM drive on which the audio CDs are able to be played. European Patent Application No. 0 952 734 discusses a television assistant which receives signals from a television and displays them on a small display. Audio data may also be reproduced by the assistant. European Patent Application No. 0 648 045 discusses video glasses, which include display surfaces on which video data, which are received from a base station, are reproduced. PCT International Patent Application No. WO 00/41381 discusses a remote control for televisions which has its own display and acoustic playback. German Published Patent Application No. 109 01 733 discusses a video system which has a central television unit that transmits video data to display units of flat video screens. European Patent Application No. 0 967 797 discusses a television system which has a remote control that has its own display.

SUMMARY OF THE INVENTION

The method according to the present invention for displaying video data may provide that video data, which are available on a data carrier in the automobile, are displayed using an electronic assistant, e.g., a personal digital assistant (PDA) or a mobile phone (UMTS), which includes a large display. In addition, the video decoding is also performed on the electronic assistant. In this manner, the car radio's processor is relieved of the radio receiver task. Typically, the display in car radios is too small to be practical for displaying feature-length films. The electronic assistant may now be used for this purpose. Moreover, this may also be done on an as-needed basis. In other words, a person who intends to purchase a personal digital assistant anyway, will thus have an additional benefit, while a different individual, who has no plans for a video display in the vehicle, is not obligated to purchase unnecessary hardware. In this context, the audio data belonging to the video data may either be decoded, in the process, by the PDA and played back, or be used by the car radio for its stereo system.

The radio receiver may send the video data in a broadcast mode to various electronic assistants, so that more than one electronic assistant is able to simultaneously display the video data. An ensemble of video data may be provided, so that a plurality of users may use their respective PDAs to view different videos.

The electronic assistant may transmit control data for the data carrier to the car radio, to enable special data to be retrieved from the data carrier. This may be necessary, for example, in the context of a repetition or a special call-up of the video data.

In addition, a car radio may be provided for implementing the method according to the present invention, which has a read device for the data carrier, a first processor for decoding audio data, a first interface for transmitting the data from and to the electronic assistant, and an arrangement for playing back the audio data. The interface for transmitting the data is either an infrared, a wireless, or a wired transmission interface.

For this, an electronic assistant for implementing the method according to the present invention includes a compatible interface, a second processor for decoding the video data, and a display for playing back the video data. A further refinement provides that the processor of the electronic assistant is also configured for decoding the audio data. The electronic assistant may then also be connected to an arrangement for acoustically playing back the audio data, thus to a loudspeaker, provided that it is not already integrated in the electronic assistant.

DETAILED DESCRIPTION

At present, videos are being increasingly digitized. In this context, MPEG2 and MPEG4 are used, in particular, as source codes. These enable high-quality, feature-length videos to be stored on a medium. The present invention uses an electronic assistant for displaying video data which are available on a data carrier, thus on a CD or a DVD, or in the car radio as a radio receiver. Besides MPEG4, other video formats, such as DFX or other real-time streaming videos may be used, which may allow for an even higher compression.

Electronic assistants are understood here to not only include PDAs, but mobile telephones, as well, which, particularly in the case of UMTS, include a large display and are, thus, suited for displaying videos. In the following, a car radio is understood to be a radio receiver. However, a TV tuner may be provided as a radio receiver. As TV tuners, analog tuners, DVB (digital video broadcasting) and DMB (digital multimedia broadcasting) come into consideration.

Figure 1:
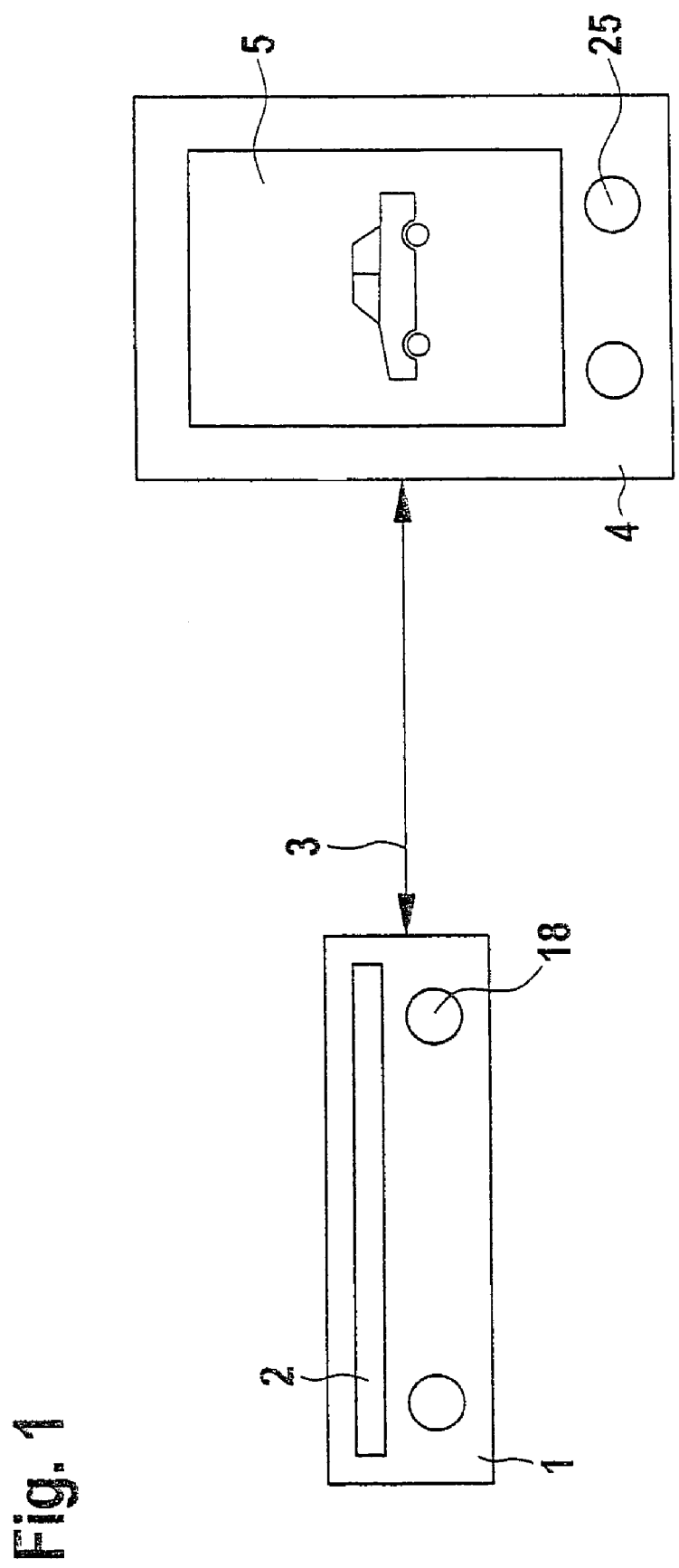
FIG. 1 shows a representation of a device according to the present invention.

FIG. 1 shows a first representation of a device according to the present invention. A car radio 1 including a disk drive 2 for a data carrier, an input device 18 and an interface 3 is connected via interface 3 to a personal digital assistant (PDA) 4, which is the electronic assistant. PDA 4 includes a display 5 and an input device 25.

Input device 18 or 25 is configured here as a keyboard. A voice control or other input elements may be used, however. Disk drive 2 is used here for CD-ROMs. Alternatively, however, a disk drive for DVDs, chip cards and mini disks may also be used. On the one hand, car radio 2 may be used for receiving radio programs and, on the other hand, for playing back from data carriers. Audio or video data reside on the data carriers. Another exemplary embodiment may provide for the CD-ROM or the alternative storage media to also be used for storing received multimedia data, then virtually any desired multimedia data, such as video, may be transmitted when receiving digital radio broadcast signals, as in the context of DAB (digital audio broadcasting).

Interface 3 is implemented here as a radio interface, for example using Bluetooth. It may also be configured as an infrared interface or as a wired interface. The PDA, which includes video decoding software, includes display 5, which is configured here as an LCD screen. However, other screen or display technologies may also be used. Bluetooth, in particular, allows for a broadcast mode, enabling a plurality of users to simultaneously view videos using their PDAs. Moreover, by transmitting an ensemble of video data, different users may view different videos. In this case, the video and audio decoding should then be undertaken by the individual PDAs, the audio data then being able to be reproduced via the headsets connected to each PDA.

The video data are read by the car radio from data carrier 2 and transmitted via interface 3 to PDA 4 which then decodes the video data using its video-decoding software or hardware and displays it on display 5. The audio data, which may, in some instances, belong to the video data, are decoded either by the car radio itself or by PDA 4. Thus, the audio data which belong to the video data may be separated by PDA 4 and are again transmitted back to the car radio, so that the car radio then takes on the task of decoding and playing back the audio data.

Figure 2:
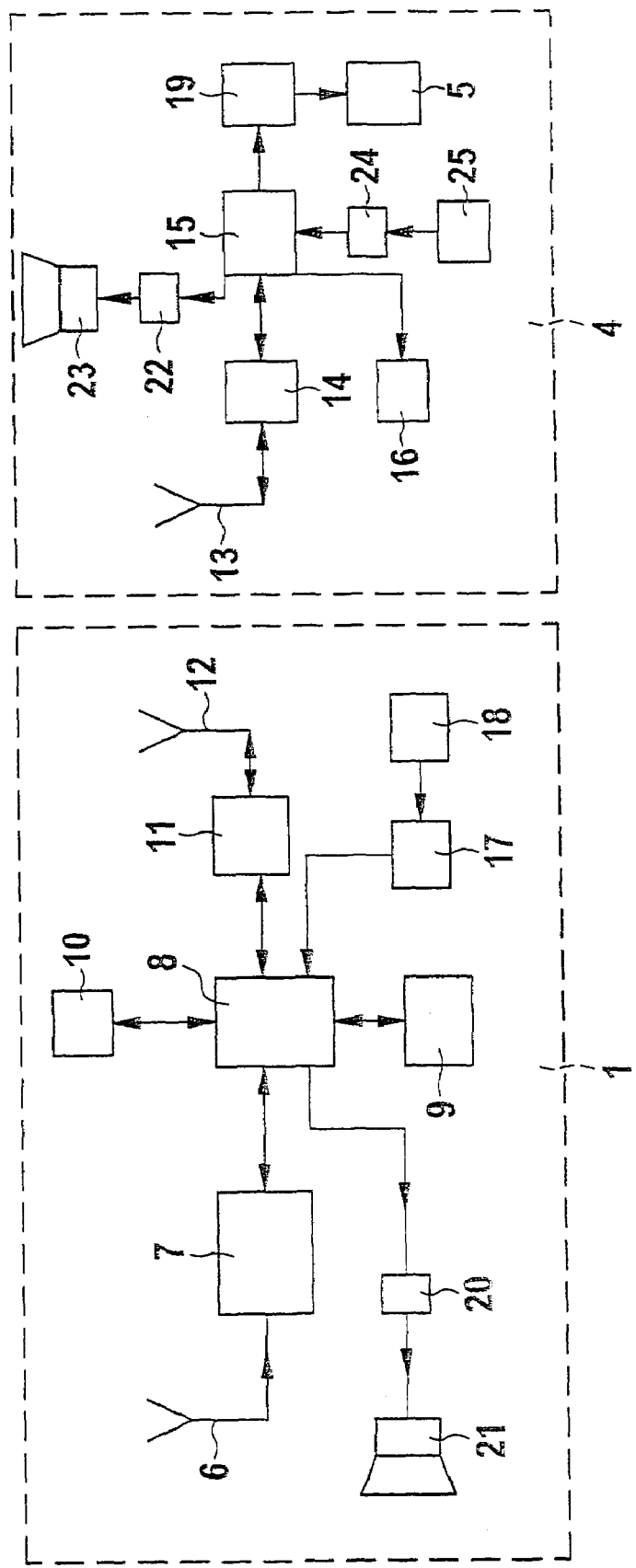
FIG. 2 shows a block diagram of the device according to the present invention.

FIG. 2 shows a block diagram of the device according to the present invention illustrated in FIG. 1. Car radio 1 includes the following components: an antenna 6, a high-frequency receiver 7, a processor 8, a memory 9, a data carrier 10, an audio amplifier 20, a loudspeaker 21, a signal-processing device 17, an input device 18, a Bluetooth receiving module 11, and an antenna 12. In this context, in order to receive the radio broadcast signals, antenna 6 is linked to high-frequency receiver 7. High-frequency receiver 7 filters, amplifies, and converts the received radio signals into an intermediate frequency. In addition, high-frequency receiver 7 assumes the task of digitizing the received radio signals, enabling the further processing to occur digitally. Processor 8, which is connected via a first data input/output, then assumes the task of a channel and source decoding.

Via a second data input/output, processor 8 is connected to data carrier 10, from where processor 8 loads the appropriate video and audio data to be reproduced or to be transmitted to PDA 4. For this, processor 8 optionally uses control data from PDA 4. For buffer storage, processor 8 uses a memory 9 connected via a third data input/output. The audio data which car radio 1 itself reproduces, are then transmitted by processor 8 to audio amplifier 20, which then uses a loudspeaker 21 for acoustic reproduction. Via a fourth data input/output, processor 8 is then linked to Bluetooth transmitting/receiving module 11. Antenna 12 for transmitting and receiving the signals is connected via a second data input/output to Bluetooth transmitting/receiving module 11. A user uses input device 18 as input medium, signal processing 17 formatting the input data for processor 8. PDA 4 includes an antenna 13 for receiving and transmitting Bluetooth signals, which is connected to a first data input/output of a Bluetooth transmitting/receiving module 14. Bluetooth transmitting/receiving module 14 is connected via a second data input/output to a processor 15. Processor 15 is connected to a memory 16 via a second data input/output. Via a first data output, processor 15 is connected to an audio amplifier 22, which is connected, in turn, to a loudspeaker 23. Via a second data output, processor 15 is connected to a signal processing 19 which drives display 5. Via a data input, processor 15 is connected to a signal processing 24 which converts input signals from input device 25 for processor 15.

Depending on whether they are transmitting or receiving signals, Bluetooth transmitting/receiving modules 11 and 14 undertake transmitting or receiving amplification, filtering, and digital-analog conversion or analog-digital conversion. In this context, analog signals are used for the radio transmission and the received signals are then reconverted into digital signals for further processing.

Figure 3:
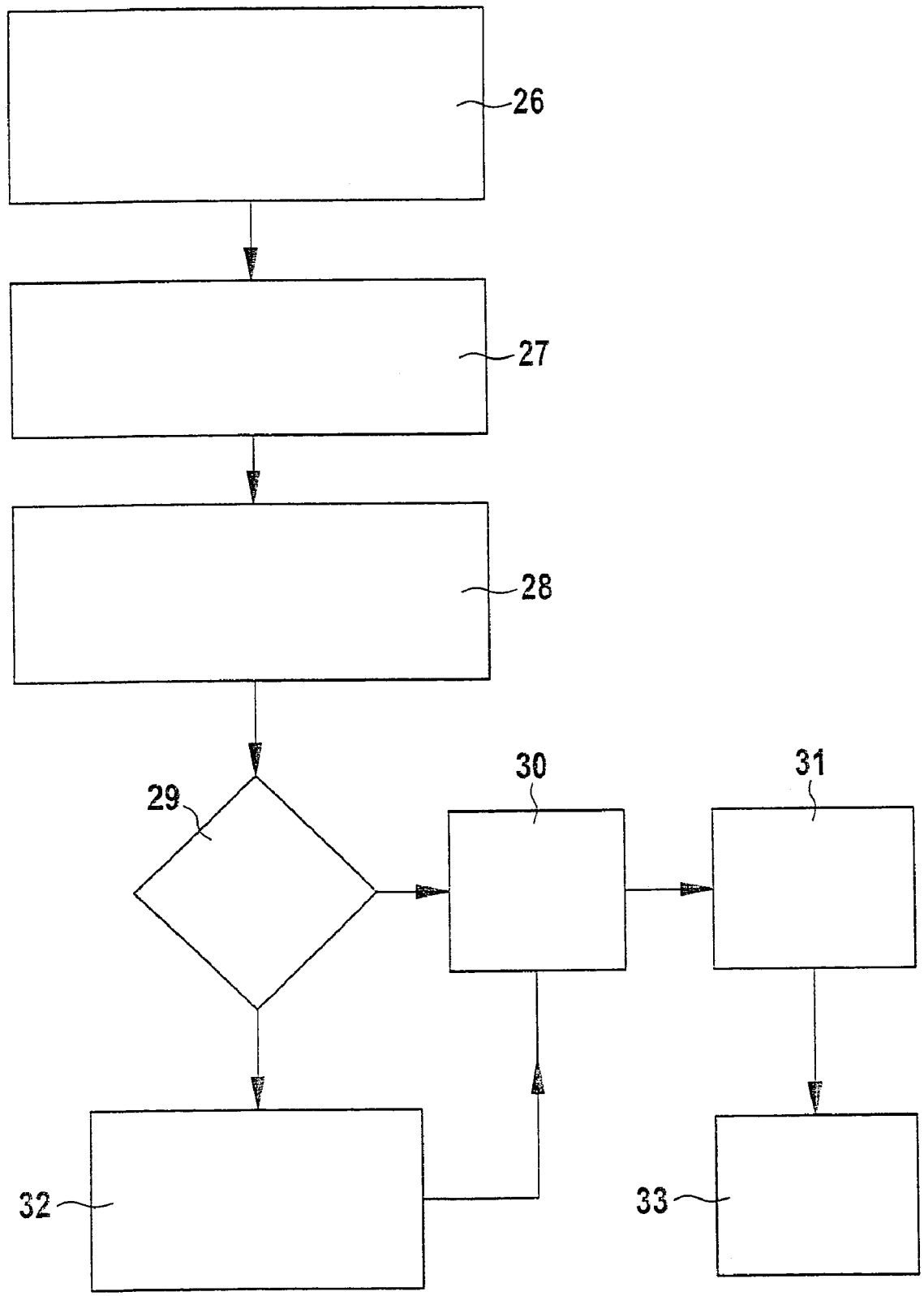
FIG. 3 shows a flow chart of the method according to the present invention.

In FIG. 3, the method according to the present invention for displaying video data is represented as a flow chart. In method step 26, the video data are loaded from data carrier 10 in car radio 1 by processor 8. If indicated, they are then stored temporarily in memory 9, to then be transmitted to PDA 4. Audio data are optionally separated here from video data.

In method step 27, using Bluetooth transmitting/receiving module 11 and antenna 12, the video data are transmitted as Bluetooth signals to PDA 4. By manner of antenna 13 and Bluetooth transmitting/receiving module 14, the video data are then received and transmitted further to processor 15 of PDA 4.

In method step 28, PDA 15 decodes the video data. For this, PDA 15 includes suitable video-decoding software and/or hardware. For the decoding process, processor 15 uses memory 16 as buffer storage. In the following, the question arises of what performs the decoding of audio data optionally accompanying the video data. This query is made in method step 29 and, in fact, as to whether the audio data are to be decoded by car radio 1. If this is the case, then, in method step 32, the audio data are retransmitted to car radio 1. In method step 30, the audio data are then either decoded by processor 15 or by processor 8. In method steps 31 and 33, which are executed in parallel, the audio data and/or the video data are reproduced either by loudspeaker 21 or 23 and display 5.

When the video data are decoded by processor 8 of car radio 1, then the representation on display 5 of PDA 4 is optimized. This is accomplished, for example, by reducing the resolution and the colors of the image, by rotating the image by 90°, and by reducing the frame rate. Since display 5 of PDA 4 is generally higher than it is wide, however, the videos wider than high, a rotation by 90° is practical for a user.

What is claimed is:

1. A method for displaying video data, comprising:
   transmitting the video data, from a data carrier of a radio receiver, to at least one electronic assistant;
   decoding the video data using the at least one electronic assistant; and
   displaying the video data on a display of the at least one electronic assistant;
   wherein the at least one electronic assistant retransmits audio data belonging to the video data directly to the radio receiver and the radio receiver decodes the audio data and reproduces the audio data using an acoustic reproduction arrangement.

2. The method of claim 1, wherein, to access the data carrier, control data are transmitted from the at least one electronic assistant to the radio receiver.

3. A radio receiver, comprising:
   a data carrier to transmit video data to at least one electronic assistant;
   a read device of the data carrier;
   a processor to decode audio data;
   an interface to transmit data from and to the at least one electronic assistant; and
   a playback arrangement to play back the audio data;
   wherein the at least one electronic assistant decodes the video data and includes a display for displaying the video data, the at least one electronic assistant retransmitting the audio data belonging to the video data directly to the radio receiver and the radio receiver decodes the audio data and reproduces the audio data using an acoustic reproduction arrangement.

4. An electronic assistant, comprising:
   an interface to transmit data from and to a radio receiver;
   a processor to decode video data; and
   a display for playing back the video data;
   wherein the at least one electronic assistant retransmits audio data belonging to the video data directly to the radio receiver for acoustic reproduction and the radio receiver decodes the audio data and reproduces the audio data using an acoustic reproduction arrangement.

5. The radio receiver of claim 3, wherein the radio receiver is a car radio receiver.

6. The radio receiver of claim 3, wherein the at least one electronic assistant includes at least one of a PDA, a mobile telephone and a UMTS.

7. The radio receiver of claim 3, further comprising: an interface provide communication with the at least one electronic assistant, wherein the interface is a radio interface, wherein the at least one electronic assistant includes at least one of a PDA, a mobile telephone and a UMTS.

8. The radio receiver of claim 3, further comprising: an interface provide communication with the at least one electronic assistant, wherein the interface includes one of a radio interface, an infrared interface and a wired interface.

9. The radio receiver of claim 3, further comprising: an interface to provide communication with the at least one electronic assistant, wherein the interface includes one of a radio interface, an infrared interface and a wired interface, and wherein the at least one electronic assistant includes at least one of a PDA, a mobile telephone and a UMTS.

10. The method of claim 1, wherein the at least one electronic assistant includes at least one of a PDA, a mobile telephone and a UMTS.

11. The method of claim 1, further comprising: an interface provide communication with the at least one electronic assistant, wherein the interface is a radio interface, wherein the at least one electronic assistant includes at least one of a PDA, a mobile telephone and a UMTS.

12. The method of claim 1, further comprising: an interface provide communication with the at least one electronic assistant, wherein the interface includes one of a radio interface, an infrared interface and a wired interface.

13. The method of claim 1, further comprising: an interface provide communication with the at least one electronic assistant, wherein the interface includes one of a radio interface, an infrared interface and a wired interface, and wherein the at least one electronic assistant includes at least one of a PDA, a mobile telephone and a UMTS.

\* \* \* \* \*